Jan. 31, 1950     W. F. LEE ET AL     2,496,168
TWO-PIECE DOUBLE DOG FOR ROVING MACHINES
Filed March 18, 1948     2 Sheets-Sheet 1

INVENTOR.
William F. Lee
William O. Junker
BY Eugene E. Stevens
ATTORNEY.

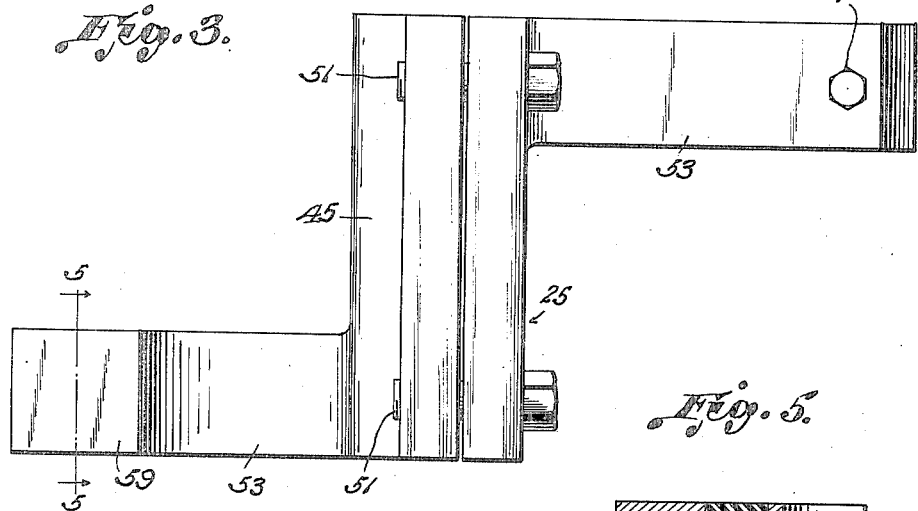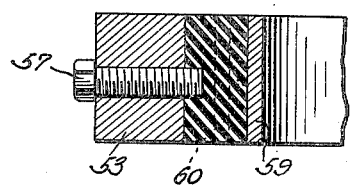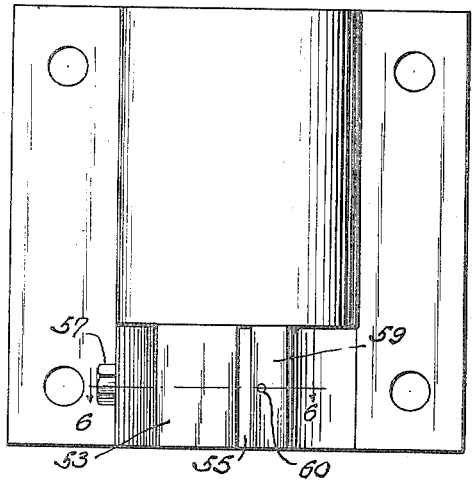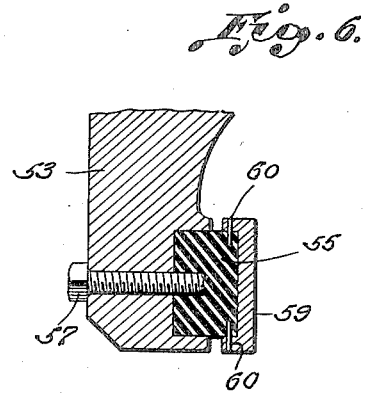

Patented Jan. 31, 1950

2,496,168

UNITED STATES PATENT OFFICE 2,496,168

TWO-PIECE DOUBLE DOG FOR ROVING MACHINES

William Franklin Lee and William Otto Junker, Spartanburg, S. C.; said Lee assignor to said Junker Application March 18, 1948, Serial No. 15,668

7 Claims. (Cl. 57—96)

This present invention relates to a dog for textile roving machines and operating on a vertical builder shaft. Such a dog includes two arms, the face of one of which slides against the metal builder with quite a force, and when it slips off the edge, the shaft turns with maximum speed causing the face of the other dog-arm to strike the builder with considerable force. The result is too much shock and a battering of the face of the dog arm as well as a battering of the builder. This causes considerable wear, making it necessary to replace the dog and builder. Occasionally a dog arm will break.

The dogs now in use are each made in one piece and held in a predetermined position against sliding on the shaft by a set-screw on one side of the dog, and by a key-way on the opposite side to prevent the dog from turning on the shaft. When one of the dog arms breaks or becomes badly worn, it is now necessary to install a complete new dog which requires from one to two hours time.

The main object of the invention is to produce a dog comprising two separable sections and requiring only ten minutes time for installation. If one of the arms should break, a new dog section may replace it, and the other arm need not be scraped.

Another object of the invention is to produce a dog of the character described, and making the set-screw of the present dog superfluous. Both sections of the dog and the builder shaft portion coacting therewith are so shaped as to enable the bolts holding the dog sections together to also clamp the same upon the shaft.

With these and other objects in view which will become apparent as the invention is fully understood, the same resides in the novelty of construction, combination and arrangement of elements fully and specifically hereinafter described, and distinctly claimed in the subjoined claims.

The description should be read in connection with the accompanying drawing in which:

Fig. 3 is an enlarged detail view in elevation of the embodiment;

Fig. 4 is an enlarged detail elevation of the embodiment viewed from the left of Fig. 3;

Fig. 5 is a detail section on the line 5—5 of Fig. 3;

Fig. 6 is a detail section of the line 6—6 of Fig. 4.

In the drawings, in which like character of reference designates like or similar elements, Fig. 1 shows the generally conventional part of a roving frame which is distinguished from the prior art by the preferred embodiment of our invention.

Figure 1:
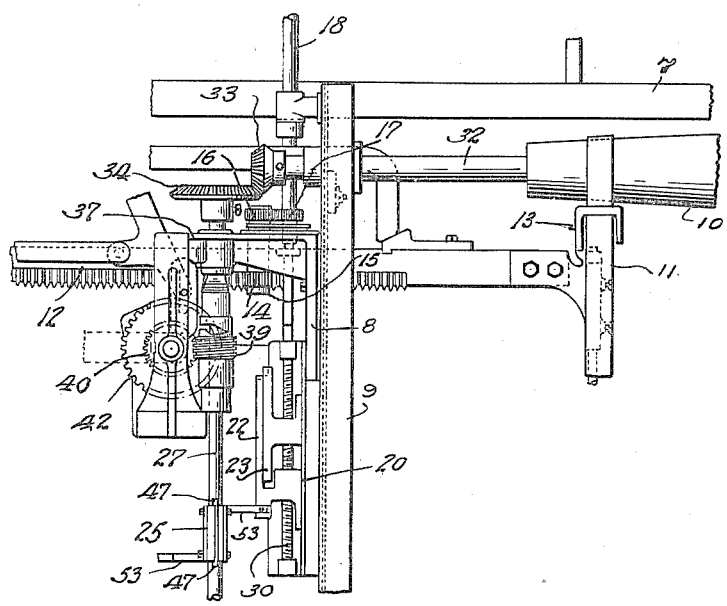
Fig. 1 is an elevation of that portion of a roving frame which includes the preferred embodiment of our invention.

In Fig. 1 a horizontal beam of the frame running lengthwise of the machine is indicated by 7. A bracket 8 is affixed to the samson 9. A convex cone pulley 10 is engaged by a belt 11 which receives its power from a main shaft (not shown) to rotate the pulley in the usual manner and common to all roving frames.

A horizontally disposed double rack 12 carries on its right-hand end a belt guide 13 in engagement with the belt and on its front face teeth engaged with a pinion 14 forming part of the usual driver. This pinion is keyed to the lower end of a stud 15 journaled in the roving frame and to the upper end of which is keyed a pinion 16. The same meshes with a pinion 17 keyed to a hollow shaft 18 which carries at its upper end a hand wheel (not shown).

The samson 9 or other part of the frame work suitably supports the usual taper-winding mechanism including a taper-motion head 20 upon which are slidably mounted jaws 22, 23 cooperating with a tumbling dog 25 on a shaft 29 still to be described. The jaws 22, 23 are automatically adjusted relative to one another to release the dog 25 at progressively shorter intervals, by a right and left hand screw 30. Since this mechanism is well known in the art, no further description thereof is required.

In the present instance, however, the taper-motion screw 30 forms an extension upon the lower end of shaft 18 instead of being formed upon a separate shaft. Thus, the machine is simplified and the resetting of the taper mechanism simultaneously with the rack is greatly facilitated.

Since the above mechanism relates to the resetting of the rack and the taper mechanism after the stopping of the machine for doffing therefore the stop motion will now be described.

At the left-hand end of the shaft 32 carrying the cone pulley 10 is a bevel gear 33 in mesh with the conventional bevel gear 34 on the upper end of the builder or tumbler-shaft 27 journaled in bearings on the plate 37. The same is supported by the bracket 8. The tumbler-shaft carries a worm 39 which engages a worm gear 40. This worm gear causes power applied to the tumbler-shaft to be transmitted by a known one-way clutch (not shown) to a gear 42 which in turn transmits the power to gearing (not shown) engaging with teeth formed on the lower horizontal face of the double rack 12.

In jaws 22, 23 form stops engaged by stop members on a dog 25 forming the subject matter of our invention. This dog consists of two separable and independently replaceable sections. Each section includes a hub portion 45 convex on one side, and having a semi-cylindrical concavity on the side facing its mating section. Each concavity receives one-half of a predetermined portion of tumbler 27. The same is preferably provided with opposite keys or ribs 47, each received in a groove 48 formed in the confronting corner edges, each defining the intersection of the end of a concave cylindrical surface with the flat inner surface of a flange 50. Each flange is an integral radially extending part of its hub portion and provided at either upper or lower end with a bolt hole registering with a bolt hole in the mating flange. Each pair of registering bolt holes receives a bolt 51. Preferably the width of a key 47 is slightly in excess of the width of the groove 48, so that the confronting flange faces are slightly spaced from one another.

Figure 2:
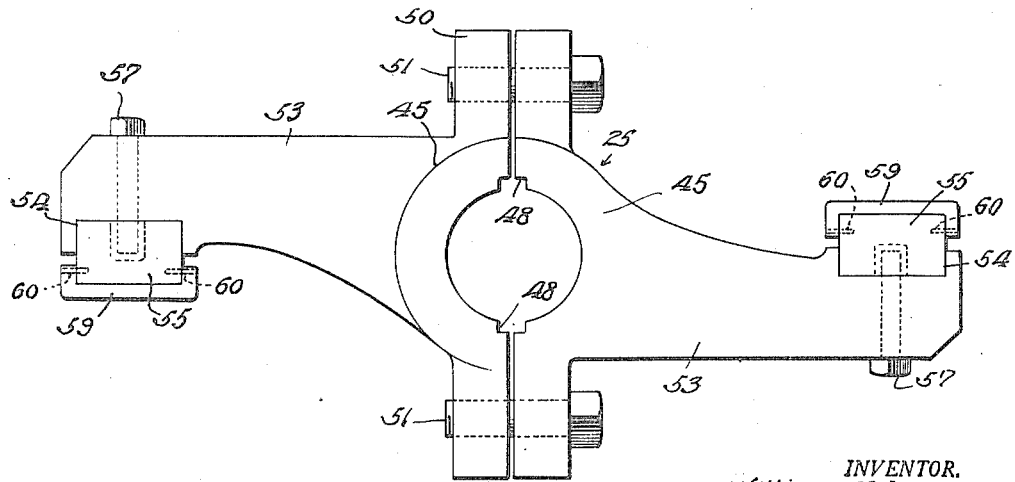
Fig. 2 is an enlarged detail plan view of such embodiment.

The left-hand hub portion carries near its lower end a substantially radial arm 53 and the right-hand hub portion carries near its upper end a similar arm. Each arm has near its free end a seat or channel 54 extending parallel to the hub and tumbler shaft. One channel opens through the front side of one arm while the other channel opens through the rear side of the other arm (Fig. 2).

Each seat reecives a rectangular rubber block 55 into which is preferably moulded a tapped bushing (not shown) to receive the screw bolt 57. The same secures the block in position.

The portion of each rubber block which projects beyond its seat or channel is partially received into a channel formed on one side of an impact member 59 of U-shaped cross section. Each of the confronting legs of an impact member carries a pin 60 extending through the inner side of the leg into the rubber block to secure the same in its impact member.

It is significant that by bolting the dog sections together, the same are also clamped upon the keys or ribs of the builder shaft.

Having thus described our invention and the advantages thereof, we do not wish to be limited to the details herein disclosed otherwise than as set forth in the appended claims.

We claim:

1. In a textile roving frame the combination of a builder shaft having a portion provided with opposite ribs, a dog composed of separable sections, each clampingly engaging said ribs when said sections are connected.

2. In a textile roving frame the combination of a builder shaft having a portion provided with a rib, and a dog composed of separable sections, each clampingly engaging said rib when said sections are connected.

3. In a textile roving frame the combination of a builder shaft having a portion provided with opposite ribs, and a dog composed of separable sections, each notched to clampingly engage said ribs when said sections are connected.

4. A dog for a builder shaft comprising separable sections bolted together, each section carrying a radial arm and shock absorbing means near the free end of each arm.

5. A dog for a builder shaft comprising separable sections bolted together, each section carrying a radial arm, a channel formed near the free end of said arm, and resilient means mounted in each channel.

6. A dog for a builder shaft comprising separable sections bolted together, each section carrying a radial arm, a channel formed near the free end of said arm, a resilient block in each channel, and an impact means carried by each block.

7. In a textile roving frame, the combination of a builder shaft of circular cross-section throughout substantially its entire length, lineally extending shoulder-providing means occupying a minor portion of both the length and circumference of said shaft, a dog comprising separable sections, and each of said sections having portions clampingly engaging said shoulder providing means when said sections are connected.

WILLIAM FRANKLIN LEE.
WILLIAM OTTO JUNKER.

REFERENCES CITED

The following references are of record in the file of this patent:

UNITED STATES PATENTS

| Number | Name | Date |
|---|---|---|
| 2,003,362 | Hendrickson | June 4, 1935 |